A. N. CHENOWETH.
FOLDING TOP FOR VEHICLES.
APPLICATION FILED AUG. 27, 1912.
1,083,273.  Patented Jan. 6, 1914.
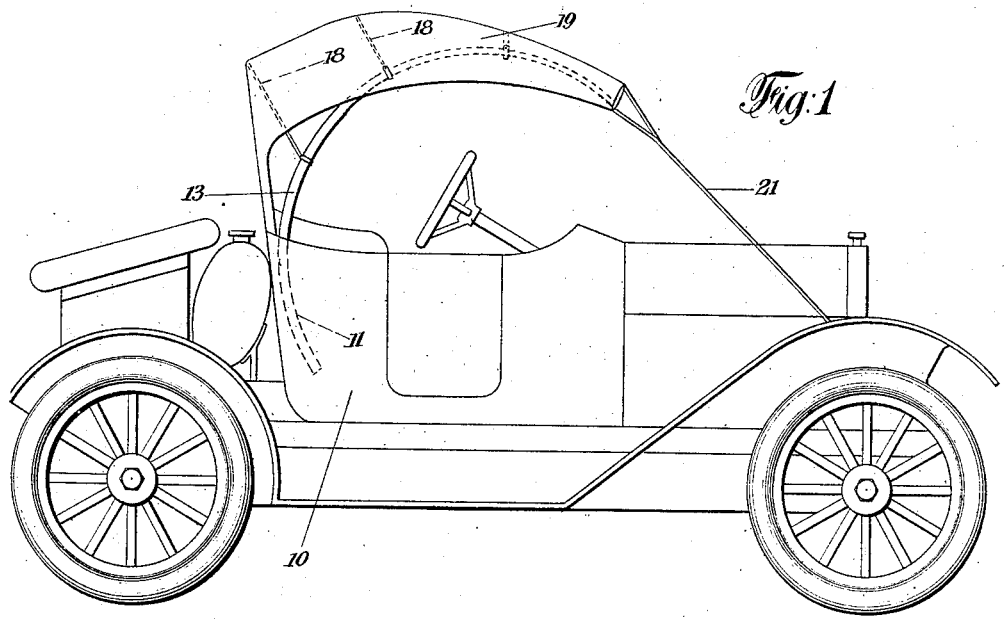
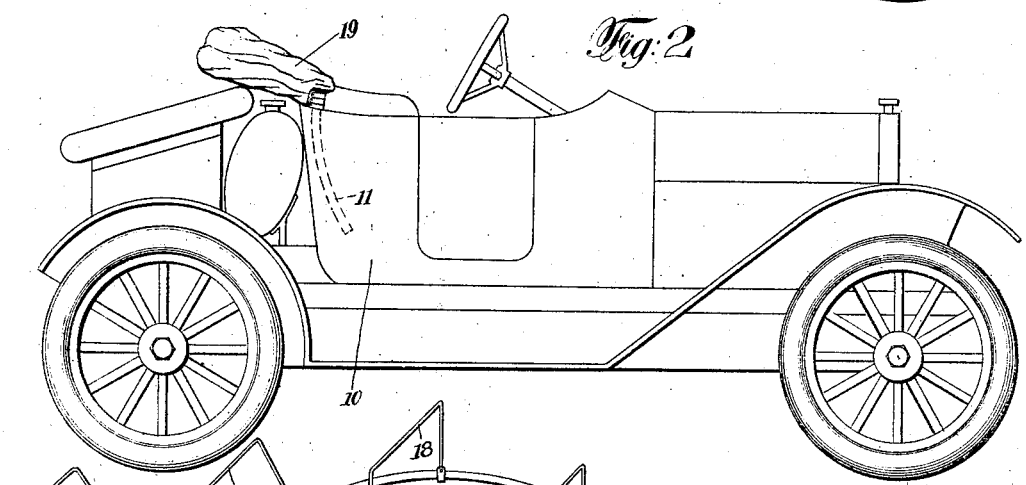
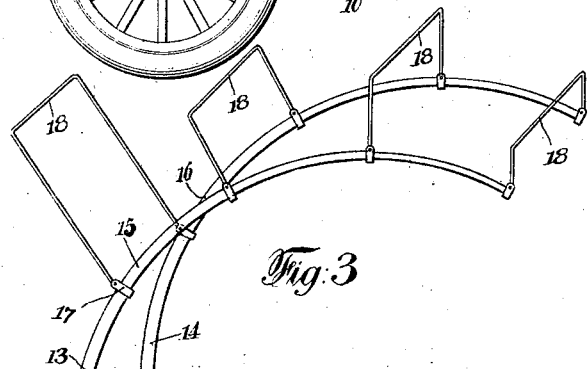
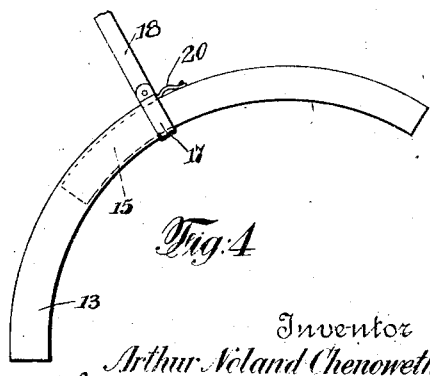
Inventor
Arthur Noland Chenoweth
By his Attorney

UNITED STATES PATENT OFFICE.

ARTHUR NOLAND CHENOWETH, OF WATERBURY, CONNECTICUT, ASSIGNOR OF ONE-HALF TO W. RICHARD UPSON, OF WATERBURY, CONNECTICUT.

FOLDING TOP FOR VEHICLES.

1,083,273.

Specification of Letters Patent.

Patented Jan. 6, 1914.

Application filed August 27, 1912. Serial No. 717,249.

*To all whom it may concern:*

Be it known that I, ARTHUR NOLAND CHENOWETH, a citizen of the United States, and a resident of Waterbury, in the county of New Haven and State of Connecticut, have invented certain new and useful Improvements in Folding Tops for Vehicles, of which the following is a specification.

The invention relates to folding tops for vehicles, more particularly automobiles; and it has for its object to so construct the frame for the said tops that there shall be but a minimum obstruction at the sides of the automobile, the usual side supports for the top being entirely dispensed with.

To this end the invention consists essentially in two sets of telescoping members fitting into the sides or back of the vehicle and supporting bows for the cover, all of which is more particularly shown in the accompanying drawings, in which—

Figure 1 is a side elevation of an automobile with the improved top attached and in open position. Fig. 2 is a similar view, but shows the top in closed or folded position. Fig. 3 is a perspective view of the telescoping members and attached bows. Fig. 4 is a detail view of a telescoping member, bow support and anti-vibrating and locking spring.

Similar characters of reference designate corresponding parts throughout the several views.

Referring to the drawings, 10 designates the body of an automobile or other vehicle and near the back of which, in the two sides thereof, are provided two curved sockets 11 adapted to receive tubular members 13 and 14 respectively, which in turn are adapted to receive similar but smaller members 15 and 16 respectively, etc., the members of the two sets, one at each side, being adapted to telescope the one into the other and the last ones into the sockets 11. The respective members are of any suitable shape and length and are arranged to provide an easy fit. At their ends these members support, by means of suitable straps 17 secured thereto, bows 18; and over which bows is drawn the cover 19. The bows are held against forward movement by the cover 19 attached thereto and by a flat sliding spring 20 secured near the inner end of the member in advance. This spring is fixed at one point and its other end is free and is adapted to slide into the member behind in telescoping, and thus provide against rattling of one member within the other. When the cover is open, as shown in Fig. 1, the forward portion is secured to the front of the machine by means of straps 21. To close the cover, the straps 21 are released and the top folded back, the various members telescoping the one within the other and the last ones in the sockets 11, permitting the top to lie back flat as shown in Fig. 2.

The frame constructed as hereinbefore described provides for a maximum clear space at the sides, permitting ready entry and exit into the machine when the cover is up, and also unobstructed vision at the sides.

I claim:

1. The combination with a vehicle body provided with suitable pockets; of a folding top comprising two curved, self-supporting, telescoping frames adapted to fit in said pockets, bows carried by the respective members of said frames, and a cover supported by said bows.

2. The combination with a vehicle body provided with an arcuate pocket at each side; of a folding top comprising two curved, self-supporting, telescoping frames adapted to fit in said pockets, bows carried by the respective members of said frames, and a cover supported by said bows.

3. The combination with a vehicle body provided with suitable pockets; of a folding top comprising two curved, self-supporting, telescoping frames adapted to fit in said pockets, bows carried by the respective members of said frames, means to automatically prevent the return of the members as the same are extended, and a cover supported by the said bows.

4. A folding top, comprising two curved, self-supporting, telescoping frames, bows pivotally carried by the respective members of said frames, and a cover supported by said bows.

5. A folding top, comprising two curved, self-supporting, telescoping frames, bows pivotally carried by the respective members, a sliding flat spring carried by the various members to limit the forward movement of the bows, to prevent the return of the same when the members are extended and to lock said members against rattling when telescoped, and a cover supported by said bows.

Signed at Waterbury in the county of New Haven and State of Connecticut this 24th day of August, A. D. 1912.

ARTHUR NOLAND CHENOWETH.

Witnesses:
JOSEPHINE H. SOMERS,
W. RICHARD UPSON.